US009154308B2

(12) United States Patent
Drewry (10) Patent No.: US 9,154,308 B2
(45) Date of Patent: Oct. 6, 2015

(54) REVOCABLE PLATFORM IDENTIFIERS

(71) Applicant: Google Inc., Mountain View, CA (US)

(72) Inventor: William Alexander Drewry, Nashville, TN (US)

(73) Assignee: Google Inc., Mountain View, CA (US)

( * ) Notice: Subject to any disclaimer, the term of this patent is extended or adjusted under 35 U.S.C. 154(b) by 77 days.

(21) Appl. No.: 14/040,482

(22) Filed: Sep. 27, 2013

(65) Prior Publication Data

US 2015/0095641 A1    Apr. 2, 2015

(51) Int. Cl.
*H04L 9/00* (2006.01)
*H04L 9/32* (2006.01)
*H04L 29/06* (2006.01)

(52) U.S. Cl.
CPC ............ *H04L 9/3268* (2013.01); *H04L 9/3236* (2013.01); *H04L 63/0823* (2013.01)

(58) Field of Classification Search
CPC ..... H04L 9/3242; H04L 9/3294; H04L 63/08; H04L 63/0823; H04L 63/0807; H04L 63/0869; H04L 63/0876; H04L 9/3268; H04L 9/3236; G06F 21/88
USPC ................. 713/158, 168–170, 173, 181, 189; 726/34
See application file for complete search history.

(56) References Cited

U.S. PATENT DOCUMENTS

| 6,782,474 | B1 * | 8/2004 | Ylonen | 713/162 |
| 6,968,453 | B2 * | 11/2005 | Doyle et al. | 713/168 |
| 7,255,270 | B2 * | 8/2007 | Kwon et al. | 235/382 |
| 7,941,632 | B2 * | 5/2011 | Karpoff et al. | 711/209 |
| 2007/0079127 | A1 | 4/2007 | Frank et al. | |
| 2013/0227653 | A1 | 8/2013 | Choi | |

FOREIGN PATENT DOCUMENTS

| JP | 2001-079532 A | 3/2001 |
| JP | 2001-282743 A | 10/2001 |
| WO | WO-2011-033533 A1 | 3/2011 |

* cited by examiner

*Primary Examiner* — Hosuk Song
(74) *Attorney, Agent, or Firm* — McDermott Will & Emery LLP (57) ABSTRACT

A method includes receiving a request for a device to replace a unique identifier associated with the device with a revocable identifier, generating a revocable identifier for the device, wherein the revocable identifier comprises at least a cryptographic representation of the unique identifier associated with the device and a counter value, checking the generated revocable identifier to determine that the generated revocable identifier has not previously been generated for the device and associating the generated revocable identifier with the device.

20 Claims, 5 Drawing Sheets

REVOCABLE PLATFORM IDENTIFIERS

BACKGROUND

When working with platform identifiers or, as they are otherwise known, device identifiers, there are concerns over exposure of such identifiers and any data associated with the identifiers, as well as with the irrevocability of the identifiers. Furthermore, service providers can make associations between users of such devices and the device identifiers, thereby potentially compromising users' privacy controls.

SUMMARY

The subject disclosure relates generally to device authentication, and more particularly to resetting device identifiers.

The subject disclosure relates to a computer-implemented method for resetting a unique identifier associated with a device. The method includes receiving a request for the device to replace the unique identifier associated with the device with a revocable identifier, generating a revocable identifier for the device, wherein the revocable identifier comprises at least a cryptographic representation of the unique identifier associated with the device and a counter value, checking the generated revocable identifier to determine that the generated revocable identifier has not previously been generated for the device and associating the generated revocable identifier with the device.

The disclosed subject matter also relates to a machine-readable medium comprising instructions stored therein, which when executed by a processor, cause the processor to perform operations that include receiving a request for a device to replace a unique identifier associated with the device with a revocable identifier, generating a revocable identifier for the device, wherein the revocable identifier comprises at least a cryptographic representation of the unique identifier associated with the device and a counter value and checking the generated revocable identifier to determine that the generated revocable identifier has not previously been generated for the device. Checking the generated revocable identifier to determine that the generated revocable identifier has not previously been generated for the device comprises checking whether the counter value has previously been associated with the device, wherein, in a case the counter value has previously been associated with the device, incrementing the counter value until a counter value that has not previously been associated with the device is identified and a revocable identifier is generated based on the identified counter value that has not previously been associated with the device. The operations further include associating the generated revocable identifier with the device by causing the device to use the generated revocable identifier as the unique identifier for subsequent instances of the device identifying itself.

The disclosed subject matter further relates to a system that includes a reset request module configured to receive a request for a device to replace a unique identifier associated with the device with a revocable identifier, a revocable identifier generation module configured to generate a revocable identifier for the device, an identifier checking module configured to check the generated revocable identifier to determine that the generated revocable identifier has not previously been generated for the device and a correlation module configured to associate the generated revocable identifier with the device by causing the device to use the generated revocable identifier as the unique identifier for subsequent instances of the device identifying itself.

These and other aspects may provide one or more of the following advantages. Re-furbished, re-conditioned or re-manufactured devices are made to appear fresh to service providers, and service providers are able to comply with various privacy initiatives while allowing a device to be re-furbished, reconditioned or re-manufactured and to appear new to the various service providers.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

In the following detailed description, numerous specific details are set forth to provide a full understanding of the present disclosure. It will be apparent, however, that the implementations of the present disclosure may be practiced without some of these specific details. In other instances, structures and techniques have not been shown in detail so as not to obscure the disclosure.

The subject disclosure provides systems and methods for reducing the sensitivity of device identifiers by adding a controlled revocability feature to the device identifier. When working with device identifiers, there are concerns over exposure and irrevocability of such identifiers. For example, once a device's identifier has been tracked in some way or blacklisted by a service, user privacy and device usability concerns may arise. This is especially true when devices are re-furbished, reconditioned or re-manufactured.

Device identifiers or keys based thereon are currently unique and permanent. They cannot be refreshed, revoked, or cleared easily and cost-effectively, without necessitating hardware replacements. Furthermore, service providers can make associations between users of such devices and the device identifiers, thereby potentially compromising users' privacy controls.

The subject disclosure provides systems and methods to allow re-furbished, re-conditioned or re-manufactured devices to appear fresh to various service provider, for example. The subject disclosure further enables such devices to not be limited by the history of the factory-generated device identifier, assigned at the time the device was originally manufactured. The subject disclosure still further provides for a static device identifier that allows third party service providers to comply with various privacy initiatives such as, for example, copyright management compliance. The subject disclosure finally allows a device to appear new to various service providers, while allowing a device to be re-furbished, reconditioned or re-manufactured.

According to aspects of the subject disclosure, a trusted service inputs a device's unique identifier and, based on the unique identifier, generates a revocable identifier for the device. Before the revocable identifier is assigned to the device, a server checks whether the generated revocable identifier has previously been assigned to the device. If the revocable identifier has previously been assigned to the device, the revocable identifier is recalculated and a new derivation of the revocable identifier is generated. Parts of the generated revocable identifier are incremented. When it is determined that the generated revocable identifier has not previously been assigned to the device, the generated revocable identifier is associated with the device. The generated revocable identifier may thereafter be used as the device's new unique identifier. That is, the generated revocable identifier may be used by the device to identify itself to various systems and services, in lieu of the unique identifier previously associated with the device.

According to an aspect of the disclosed technology, the generated revocable identifier can be revoked simply by incrementing the counter value. Future reset requests result in a different generated revocable identifier than was previously assigned by a resetting service. According to a further aspect of the disclosed technology, the counter value cannot be decremented, so generated revocable identifiers do not revert to a previous value.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Figure 1:
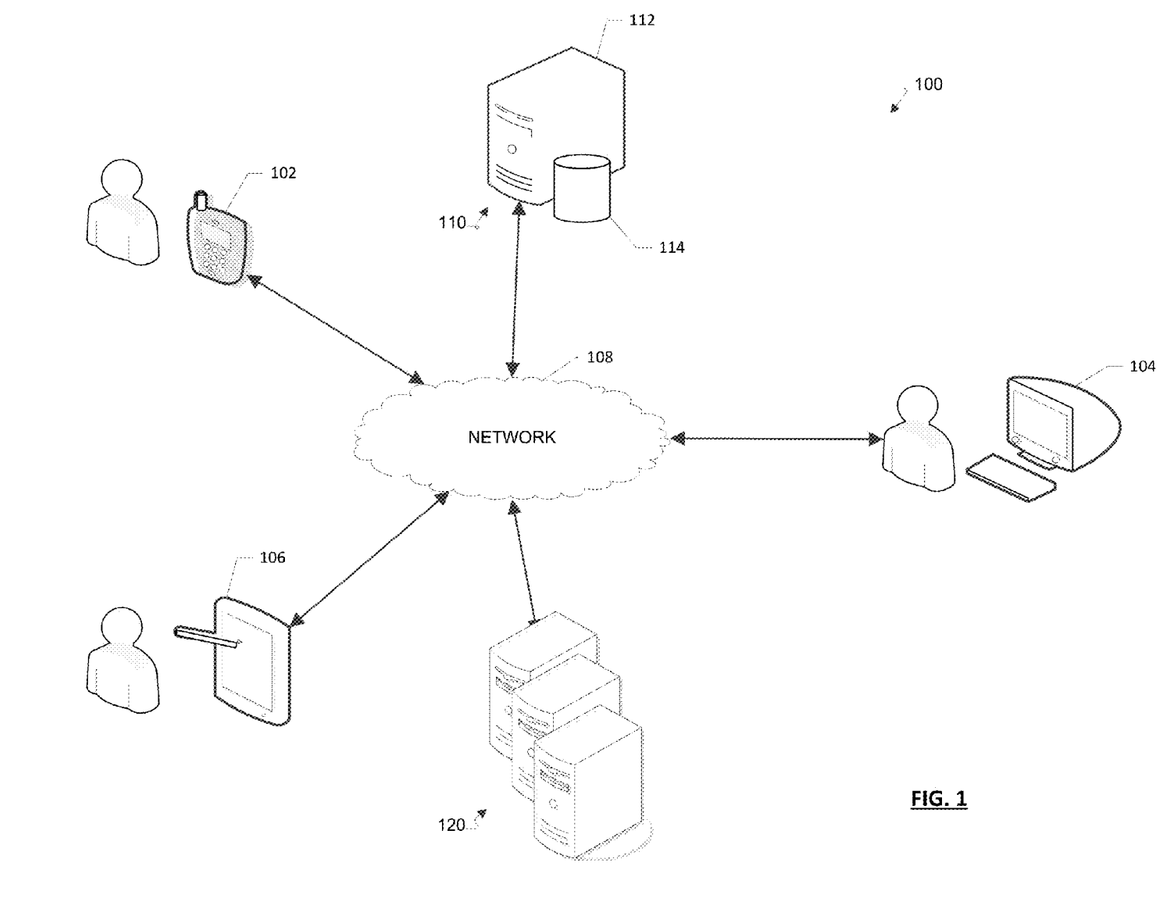
FIG. 1 is a diagram of an example client-server network for resetting a unique identifier associated with a device.

FIG. 1 illustrates an example client-server network that provides for resetting a unique identifier associated with a device. A network display 100 includes a number of electronic devices 102, 104 and 106 communicably connected to a server 110 by a network 108. Server 110 includes a processing device 112 and a data store 114. Processing device 112 executes computer instructions stored in data store 114, for example, instructions to process a received request for the device to replace the unique identifier associated with the device with a revocable identifier, generate a revocable identifier for the device, check the generated revocable identifier to determine that the generated revocable identifier has not previously been generated for the device and associate the generated revocable identifier with the device. Data store 114 may also store unique identifiers, generated revocable identifiers and other information. In certain implementations, data store 114 only stores revoked or reset identifiers, and does not store unique identifiers or generated revocable identifiers that are "active" or in use.

The server 110 or application servers 120 may generate a cryptographic representation of a unique identifier associated with a device. The server 110 or application servers 120 may apply a cryptographic hash algorithm to the unique identifier associated with the device to generate a cryptographic representation of the unique identifier. The server 110 or application servers 120 may also check the generated revocable identifier to determine that the generated revocable identifier has not previously been generated for the device. This may be done by checking whether a counter value has previously been associated with the device. When the counter value has previously been associated with the device. The server 110 or application servers 120 may increment the counter value until a counter value that has not previously been associated with the device is identified and a revocable identifier is generated based on the identified counter value that has not previously been associated with the device.

In some example aspects, electronic devices or client devices, as used interchangeably herein, 102, 104 and 106 can be computing devices such as smartphones, PDAs, portable media players, tablet computers, televisions or other displays with one or more processors coupled thereto or embedded therein, or other appropriate computing devices that can be used for running a mobile application.

Electronic devices 102, 104 and 106 may have one or more processors embedded therein or attached thereto, or other appropriate computing devices that can be used for accessing a host, such as server 110. In the example of FIG. 1, electronic device 102 is depicted as a smartphone, electronic device 104 is depicted as a tablet computer, and electronic device 106 is depicted as a PDA. A client is an application or a system that accesses a service made available by a server which is often (but not always) located on another computer system accessible by a network. Some client applications may be hosted on a website, whereby a browser is a client. Such implementations are within the scope of the subject disclosure, and any reference to client may incorporate a browser and reference to server may incorporate a website.

Application servers 120 are in communication with the electronic devices 102, 104 and 106 through network 108. Each electronic device 102, 104 and 106 may be a client device or a host device. In some example aspects, server 110 can be a single computing device such as a computer server. In other implementations, server 110 can represent more than one computing device working together to perform the actions of a server computer (e.g., cloud computing). The server 110 may host the web server communicationally coupled to the browser at the client device (e.g., electronic devices 102, 104 or 106) via network 108.

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
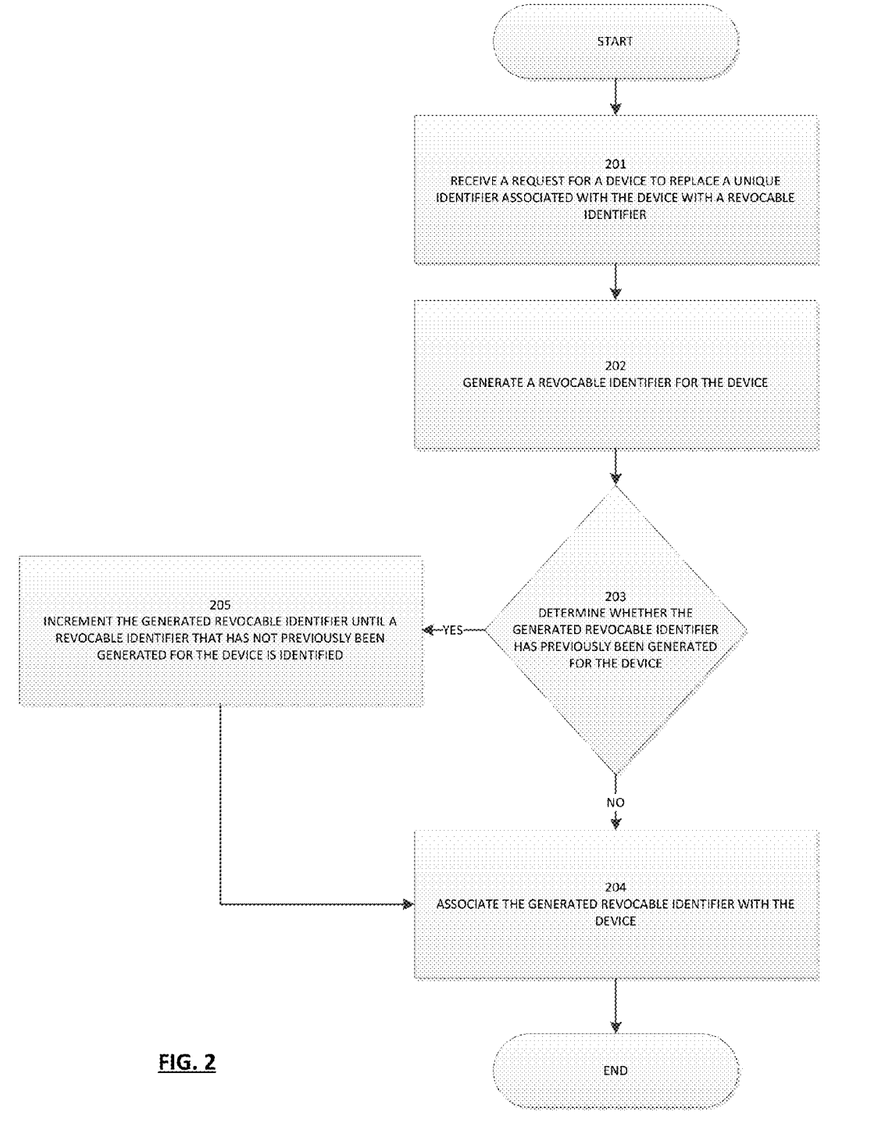
FIG. 2 illustrates a flow diagram of an example process for resetting a unique identifier associated with a device.

FIG. 2 illustrates a flow diagram of an example process 200 for resetting a unique identifier associated with a device. Resetting, as used herein, includes, but is not limited to, making a device appear new, for purposes of device identification or other purposes, after the device has been re-furbished, re-conditioned, or re-manufactured. The process 200 starts and at block 202, a system receives a request for a device to replace the unique identifier associated with the device with a revocable identifier. The request may be received from the device or from an authorized third party resetting the device.

According to an aspect of the disclosed technology, the received request includes at least the unique identifier associated with the device. Such unique identifier may have been set by manufacturer of the device at a time the device was manufactured. In some instances, the unique identifier received with the request is a previously generated revocable identifier generated in a previous request to replace a unique identifier with a revocable identifier.

At block 204, the system generates a revocable identifier for the device. The revocable identifier comprises at least a cryptographic representation of the unique identifier associated with the device and a counter value. A trusted service inputs a device's unique identifier and, based on the unique identifier, generates a revocable identifier for the device.

The generated revocable identifier is a mix of the unique identifier and a counter value. The unique identifier value is concealed using, for example, a cryptographic hash algorithm. The counter value, in turn, is a combination of a "reset token" value and a "number of resets" value. A "reset token" value is a randomly selected or generated value, an assortment of bytes selected by a server in response to a reset request. A "number of resets" value represents the number of times a particular device has been reset. The "number of resets" value starts at "0" and goes up.

A reset, as used herein, refers to a device being made to appear new for purposes of device identification, when the device is re-furbished, re-conditioned or re-manufactured. Reset requests may be received from devices being re-furbished, re-conditioned or re-manufactured for the first time. Reset requests may likewise be received from devices that have previously been re-furbished, re-conditioned or re-manufactured and have previously been assigned a generated revocable identifier. Both types of requests are treated the same, for the purposes of generating a revocable device identifier. The previously generated revocable identifiers are treated as unique identifiers and are reset similarly to unique device identifiers. In other words, a previously generated revocable identifier may be treated by the system as the unique identifier in a reset request.

A generated revocable identifier may look like a set of values represented by "[unique identifier], [reset token], [number of resets]." According to an aspect of the subject disclosure, before the unique identifier is made part of the generated revocable identifier, the unique identifier is obfuscated with a cryptographic hash algorithm. Thus, for a device whose unique identifier is "123459876," for example, the first time the device is reset, the generated revocable identifier may look like: "[cryptographic version of Ser. No. 12/345, 9876], [abc], [0]," wherein [abc] represents a reset token that is generated or selected randomly by a server in response to a reset request, and [0] represents the number of resets value which corresponds to the number of times the particular device has previously been reset.

At block 206, the system checks the generated revocable identifier to determine whether the generated revocable identifier has previously been generated for the device. Previously assigned revocable identifiers, when available, may be stored at the same or different server and used as a checking mechanism when checking the generated revocable identifier. If a match is found and it is determined that the generated revocable identifier has previously been assigned to the device, the "number of resets" values of the generated revocable identifier is incremented at block 208. That is, the "number of resets" value is incremented from [0] to [1]. Additionally, a new "reset token" may be selected or generated for the subject reset request or alternatively, the same "reset token" may be used.

According to one aspect of the disclosed technology, a server may also look up previously assigned revocable identifiers, when available, and determine that a particular device has previously been reset "X" number of times. The server may thus cause the "number of resets" value to be incremented to "X+1," which reflects the number of times the device has been reset plus "1." This may be done by referring to the previously assigned revocable identifiers associated with the device, when available, and may help to prevent a server from having to increment the "number of resets" value by "1" until the right value is reached and may offer an expedited way to generate a revocable identifier. A revocable identifier generated in this manner may still need to be checked, in line with the processes described with reference to block 206.

When it is determined that the generated revocable identifier has not previously been assigned to the device, the process continues to block 210, where the system associates the generated revocable identifier with the device. Once the generated revocable identifier is associated with the device, the generated revocable identifier is used as the device's unique identifier, to identify the device to various systems and services. That is, the generated revocable identifier is used by the device instead of the unique identifier previously associated with the device.

According to an aspect of the disclosed technology, the system causes the device to use the generated revocable identifier as the unique identifier for subsequent instances of the device identifying itself. Furthermore, the generated revocable identifier may be submitted as the unique identifier associated with the device in subsequent requests to replace a unique identifier associated with the device with a revocable identifier. The generated revocable identifier is associated with the device until a next request to replace a unique identifier with a revocable identifier is received by the system. At a minimum, the server may be configured to validate that the server can do the exchange.

Figure 3:
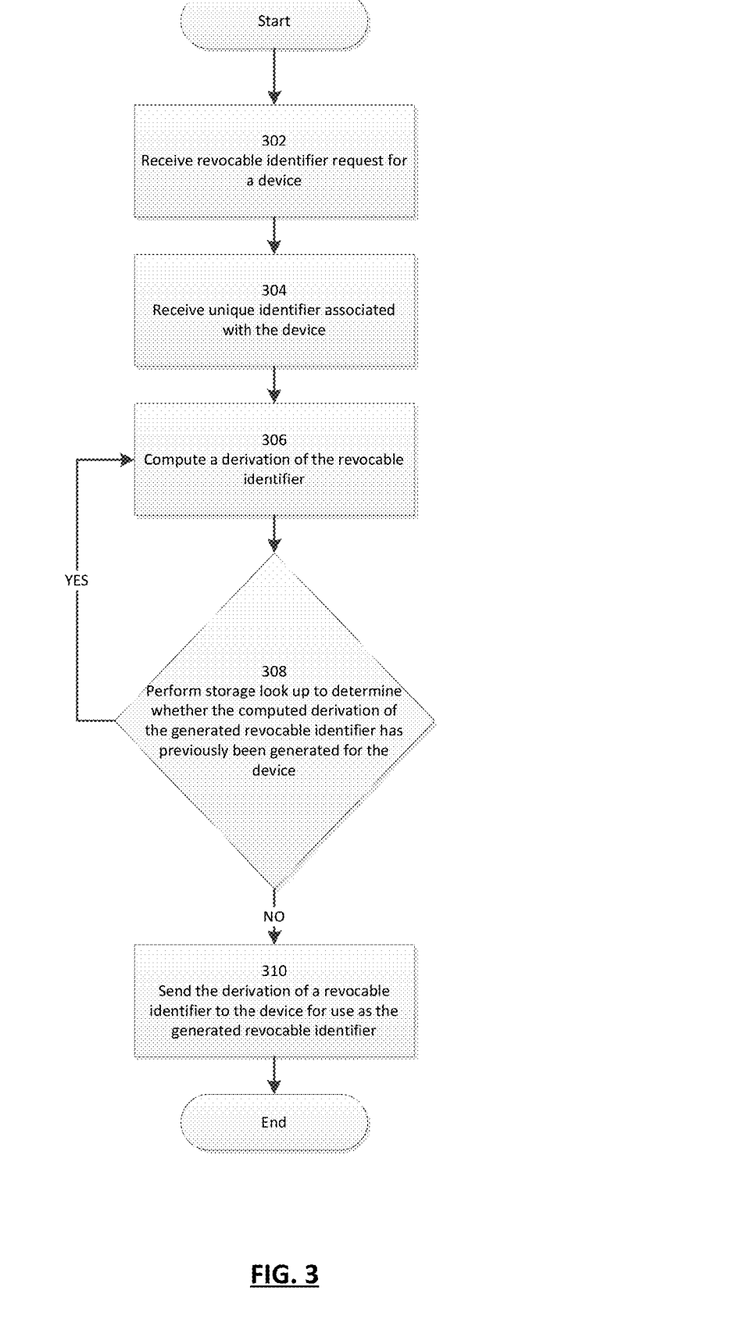
FIG. 3 illustrates a flow diagram of an example process for generating a revocable identifier associated with a device.

FIG. 3 illustrates a flow diagram of an example process 300 for trading a unique identifier for a revocable identifier. At block 302, a revocable identifier is requested for a particular device. The request, as discussed previously, may be received from the device, a device manufacturer, a device servicer or from a third party service authorized to issue such a request. The server receiving the request is associated with a trusted service authorized to replace unique identifiers with revocable identifiers. The server may be server 110 or application servers 120 on the client-server network of FIG. 1.

At block 302, the server receives the unique identifier associated with the device. The unique identifier may be, for example, "123459876." A unique identifier may be numeric, alpha-numeric or an alternate mix of numbers, letters, symbols or characters. The unique identifier may be received from the same entity requesting the revocable identifier or from another authorized entity on the client-server network of FIG. 1.

At block 304, the server computes a first derivation of a generated revocable identifier. For purposes of this discussion, a generated revocable identifier may be referred to as, for example, "RI" and the first derivation of a generated revocable identifier may be referred to as "RI'." For purposes of illustration only, "RI'" may be "[(cryptographic version of Ser. No. 12/345,9876)], [abc], [0]" where the unique identifier is obfuscated to appear as "543219876" and "RI'= [543219876], [abc], [0]." Alternatively, the cryptographic algorithm may be applied to the full string of values, the unique identifier, the reset token and the reset value, resulting in RI'="[cryptographic version of ([123459876] [abc] [0]), where RI'="54321abc98760." According to an aspect of the disclosed technology, a cryptographic hash algorithm such as HMAC (keyed-hash message authentication code) with the unique identifier as the "key" material may be used to generate "RI'." For example, HMAC-SHA256(unique key, reset token and reset id) or HMAC-SHA256(unique key, reset token, reset id and generated id). The next identifier may be derived using the unique id and subsequent generated identifiers or any combination thereof; as long as the resulting value cannot be easily reversed by the server or by a recipient of the generated ID and the identifier can be recomputed in the future if the original unique identifier is supplied to the server.

At block 306, a storage lookup is performed for "RI'" to determine whether a revocable identifier that matches the value derived for "RI'" has previously been generated for the device. The storage lookup may be performed by the server or by another part of the client-server network of FIG. 1. The look up may take place in the server's datastore or elsewhere on the client-server network of FIG. 1. In other words, the server checks whether there already exists a revocable identifier set that matches the value of "RI'."

According to an aspect of the disclosed technology, the storage lookup is performed in the context of the same device. That is, the system checks whether a revocable identifier that matches the value derived for "RI'" has previously been generated. For example, two devices may eventually generate the same generated identifier, but it is improbable to do so while having the same reset count. Thus, if it appears that a "RI'" exists but the reset count doesn't match, the reset token may be regenerated, or the server may skip that reset, increment the reset count, and see if the next one collides using the same reset token it used for the prior reset count value. Historic revocable identifiers may be stored in the format "generated revocable identifier, reset token, number of resets." Alternatively, a single check may determine if the identifier has been generated for any device as the storage service may not be able to tell devices apart.

Assuming RI'="[543219876] [abc] [0]," if the server 110 finds at the datastore or elsewhere a previously generated revocable identifier where RI'="[543219876] [abc] [0]," the server 110 computes a second derivation of the revocable identifier, "RI"." In the second derivation, the reset token stays the same, however, the reset counter value is incremented by 1. Thus, in the current example, the number of resets value is increased to "1." According to an aspect of the disclosure, a new reset token may be issued with each derivation. For example, the new reset count may not be stored anywhere until the next reset request, but the count may be incremented for inclusion in the computation.

The server 110 repeats the storage look up described with reference to block 306 for the second derivation, "RI"." The server continues this loop of computing and checking derivations until a derivation of a revocable identifier that does not match any previously generated revocable identifier is identified by the server 110 at block 308. When a derivation of a revocable identifier that does not match any previously generated revocable identifier is identified by the server 110, the server sends the identified derivation to the device for use as the device's generated revocable identifier at block 310.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing display. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
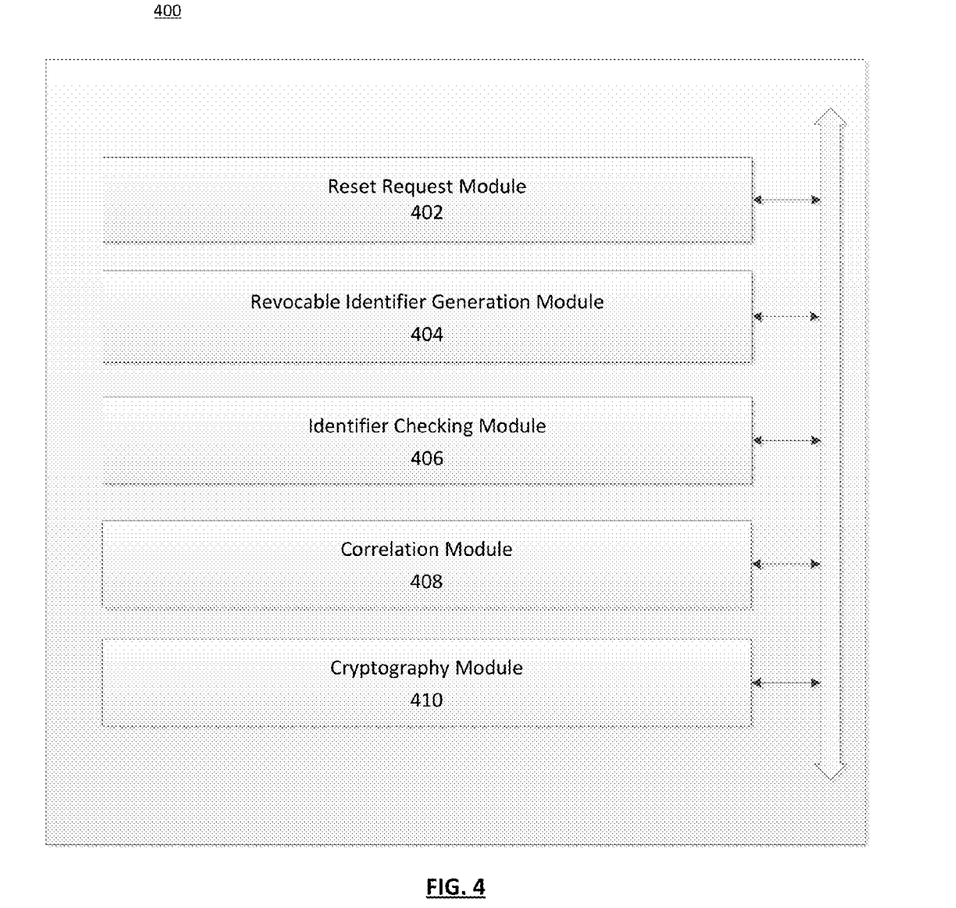
FIG. 4 conceptually illustrates an example of a system for resetting a unique identifier associated with a device.

FIG. 4 illustrates an example of system 400 for resetting a unique identifier associated with a device in accordance with various aspects of the subject technology. System 400 comprises a reset request module 402, a revocable identifier generation module 404, an identifier checking module 406, and a correlation module 408.

The reset request module 402 is configured to receive a request for a device to replace a unique identifier associated with the device with a revocable identifier. The revocable identifier generation module 404 is configured to generate a revocable identifier for the device. The identifier checking module 406 is configured to check the generated revocable identifier to determine that the generated revocable identifier has not previously been generated for the device. The correlation module 408 is configured to associate the generated revocable identifier with the device by causing the device to use the generated revocable identifier as the unique identifier for subsequent instances of the device identifying itself.

The system of FIG. 4 may further include a cryptography module 410 configured to generate a cryptographic representation of the unique identifier associated with the device by applying a cryptographic hash algorithm to the unique identifier associated with the device to generate the cryptographic representation of the unique identifier associated with the device.

The correlation module 408 may further be configured to submit the generated revocable identifier as the unique identifier associated with the device in subsequent requests to replace the unique identifier associated with the device with the revocable identifier. The correlation module 408 may still further be configured to associate the generated revocable identifier with the device until a next request to replace the unique identifier with the revocable identifier.

These modules may be in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices)

and/or a combination of both. Additional features and functions of these modules according to various aspects of the subject technology are further described in the present disclosure.

Figure 5:
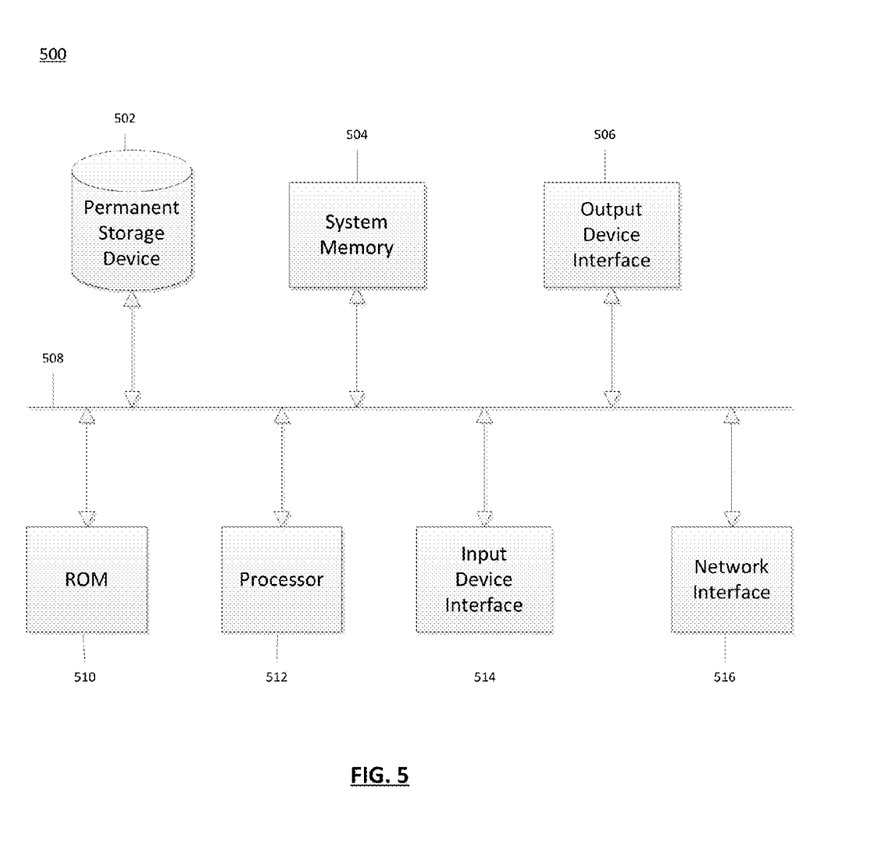
FIG. 5 conceptually illustrates an electronic system with which some aspects of the subject technology are implemented.

FIG. 5 conceptually illustrates an electronic system with which some aspects of the subject technology are implemented. Electronic system 500 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as televisions or other displays with one or more processors coupled thereto or embedded therein, or other appropriate computing devices that can be used for running an application. Some implementations include devices such as a touch screen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a device having a display device, e.g., televisions or other displays with one or more processors coupled thereto or embedded therein, or other appropriate computing devices that can be used for running an application, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A computer-implemented method for resetting a unique identifier associated with a device, the method comprising:
   receiving a request for the device to replace the unique identifier associated with the device with a revocable identifier;
   generating a revocable identifier for the device, wherein the revocable identifier comprises at least a cryptographic representation of the unique identifier associated with the device and a counter value;
   checking the generated revocable identifier to determine that the generated revocable identifier has not previously been generated for the device; and
   associating the generated revocable identifier with the device.

2. The computer-implemented method of claim 1, wherein the received request comprises at least the unique identifier associated with the device.

3. The computer-implemented method of claim 1, wherein the counter value comprises at least a reset token associated with the received request and a number of resets value associated with the device.

4. The computer-implemented method of claim 3, wherein the reset token is a random value selected in response to the received request.

5. The computer-implemented method of claim 3, wherein the number of resets value represents a number of times a request to replace the unique identifier associated with the device with a revocable identifier has been received for the device.

6. The computer-implemented method of claim 1, wherein generating the revocable identifier comprises generating a cryptographic representation of the unique identifier associated with the device.

7. The computer-implemented method of claim 6, further comprising applying a cryptographic hash algorithm to the unique identifier associated with the device to generate the cryptographic representation of the unique identifier associated with the device.

8. The computer-implemented method of claim 1, wherein checking the generated revocable identifier to determine that the generated revocable identifier has not previously been generated for the device comprises checking whether the counter value has previously been associated with the device, wherein, in a case the counter value has previously been associated with the device, incrementing the counter value until a counter value that has not previously been associated with the device is identified and a revocable identifier is generated based on the identified counter value that has not previously been associated with the device.

9. The computer-implemented method of claim 1, wherein associating the generated revocable identifier with the device comprises causing the device to use the generated revocable identifier as the unique identifier for subsequent instances of the device identifying itself.

10. The computer-implemented method of claim 1, wherein associating the generated revocable identifier with the device comprises submitting the generated revocable identifier as the unique identifier associated with the device in subsequent requests to replace the unique identifier associated with the device with the revocable identifier.

11. The computer-implemented method of claim 1, wherein the unique identifier received with the request to replace the unique identifier with the revocable identifier is a generated revocable identifier generated by a previous request to replace the unique identifier with the revocable identifier.

12. The computer-implemented method of claim 1, wherein associating the generated revocable identifier with the device comprises associating the generated revocable identifier with the device until a next request to replace the unique identifier with the revocable identifier.

13. The computer-implemented method of claim 1, wherein the unique identifier associated with the device is set by manufacturer of the device at a time the device is manufactured.

14. A non-transitory machine-readable medium comprising instructions stored therein, which when executed by the processors, cause the processors to perform operations comprising:
  receiving a request for a device to replace a unique identifier associated with the device with a revocable identifier;
  generating a revocable identifier for the device, wherein the revocable identifier comprises at least a cryptographic representation of the unique identifier associated with the device and a counter value;
  checking the generated revocable identifier to determine that the generated revocable identifier has not previously been generated for the device, wherein checking the generated revocable identifier to determine that the generated revocable identifier has not previously been generated for the device comprises checking whether the counter value has previously been associated with the device, wherein, in a case the counter value has previously been associated with the device, incrementing the counter value until a counter value that has not previously been associated with the device is identified and a revocable identifier is generated based on the identified counter value that has not previously been associated with the device; and
  associating the generated revocable identifier with the device by causing the device to use the generated revocable identifier as the unique identifier for subsequent instances of the device identifying itself.

15. The non-transitory machine-readable medium of claim 14, wherein the received request comprises at least the unique identifier associated with the device.

16. The non-transitory machine-readable medium of claim 14, wherein the counter value comprises at least a reset token associated with the received request and a number of resets value associated with the device.

17. The non-transitory machine-readable medium of claim 14, wherein associating the generated revocable identifier with the device further comprises submitting the generated revocable identifier as the unique identifier associated with the device in subsequent requests to replace the unique identifier associated with the device with the revocable identifier.

18. The non-transitory machine-readable medium of claim 14, wherein the unique identifier received with the request to replace the unique identifier with the revocable identifier is a generated revocable identifier generated by a previous request to replace the unique identifier for the revocable identifier.

19. The non-transitory machine-readable medium of claim 14, wherein associating the generated revocable identifier with the device comprises associating the generated revocable identifier with the device until a next request to replace the unique identifier for the revocable identifier.

20. A system comprising:
  a reset request module configured to receive a request for a device to replace a unique identifier associated with the device with a revocable identifier;
  a revocable identifier generation module configured to generate a revocable identifier for the device;
  an identifier checking module configured to check the generated revocable identifier to determine that the generated revocable identifier has not previously been generated for the device; and
  a correlation module configured to associate the generated revocable identifier with the device by causing the device to use the generated revocable identifier as the unique identifier for subsequent instances of the device identifying itself.

* * * * *